(12) United States Patent
Bortfeld

(10) Patent No.: US 6,718,294 B1
(45) Date of Patent: Apr. 6, 2004

(54) SYSTEM AND METHOD FOR SYNCHRONIZED CONTROL OF SYSTEM SIMULATORS WITH MULTIPLE PROCESSOR CORES

(75) Inventor: Ulrich Bortfeld, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

(21) Appl. No.: 09/571,924

(22) Filed: May 16, 2000

(51) Int. Cl.$^7$ .................. G06F 13/10; G06F 13/12; G06F 9/44
(52) U.S. Cl. ................ 703/20; 703/21; 703/22; 703/28; 714/37; 717/134; 717/135
(58) Field of Search .............. 703/14–28; 709/102; 717/134, 135; 714/37, 45–46

(56) References Cited

U.S. PATENT DOCUMENTS

| | | | |
|---|---|---|---|
| 5,771,370 A | 6/1998 | Klein ..................... | 703/13 |
| 5,805,867 A * | 9/1998 | Kodaira .................. | 703/21 |
| 5,978,584 A * | 11/1999 | Nishibata et al. ......... | 717/134 |
| 6,014,512 A * | 1/2000 | Mohamed et al. ........... | 703/27 |
| 6,356,862 B2 * | 3/2002 | Bailey ................... | 703/16 |

OTHER PUBLICATIONS

Kalavade et al, "Software Environment for a Multiprocessor DSP", IEEE Design Automation Conference, pp. 827–830 (Jun. 1999).*

Stoyen et al, "A Language Support Environment for Complex Distributed Real–Time Applications," Third IEEE International Conference on Engineering of Complex Computer Systems,, pp. 212–221 (Sep. 1997).*

Gabbay et al, "Smart: An Advanced Shared–Memory Simulator—Towards a System–Level Simulation Environment," IEEE Fifth International Symposium on Modeling, Analysis, and Simulation of Computer and Telecommunication Systems, pp. 131–138 (Jan. 1997).*

* cited by examiner

Primary Examiner—Samuel Broda
(74) Attorney, Agent, or Firm—Farjami & Farjami LLP

(57) ABSTRACT

A debugging environment for a multi-processor simulator or emulator is disclosed. The simulator or emulator is ideally suited for the development of embedded software. The simulator can contain multiple processor models, with each processor model representing a processor. The simulator or emulator also includes a scheduler which controls the execution of the processor models. Each processor also communicates with a debugger via a debug adapter. The debug adapter acts as a pass-through filter for non-control commands which are communicated between a processor and its attached debugger. However, the debug adapter routes control commands to the scheduler. The scheduler ensures that all of the processors and debuggers maintain synchronization. Other modules can also be included in the multi-processor simulation environment, for example, clock gate modules.

17 Claims, 18 Drawing Sheets

SYSTEM AND METHOD FOR SYNCHRONIZED CONTROL OF SYSTEM SIMULATORS WITH MULTIPLE PROCESSOR CORES

FIELD OF THE INVENTION

This invention relates generally to software debuggers and, more particularly, to a method for synchronizing the interaction of multiple debuggers.

BACKGROUND OF THE INVENTION

Embedded systems programming is the development of programs which are intended to be incorporated on a microprocessor that can be included as a part of a variety of hardware devices. Software for embedded systems is typically developed using a single micro-controller or a digital signal processor (DSP) and either an emulation device or a simulation module to which a debugger is attached. A debugger is a tool which aids a programmer or developer in locating and correcting bugs, i.e., errors. In the case of a simulation module, the simulator and the debugger are implemented in software. In the case of an emulation device, the emulation device is a hardware component and the device driver, which is implemented in software, communicates with the debugger.

FIG. 1 shows a prior art single processor simulation environment. As shown in FIG. 1, a simulator 100 includes a processor model 110 and a debugger 120 which communicates with the processor model 110. The debugger 120 is used to display the state of the debug target (i.e., processor model 110) and to control it, for example, by setting breakpoints or intercepting instructions.

Many embedded software applications are complex and a single micro-processor system, such as the one shown in FIG. 1, may not adequately support such complex applications. Multi-processor systems were created to handle these complex systems. Today, integrated circuits are able to integrate the control of the target. A circuit may contain multiple processors as shown in the prior art multi-processor simulation environment of FIG. 2. Simulator 200 includes three processor models 210a, 210b and 210c. Like the single processor system shown in FIG. 1, each processor model 210a, 210b and 210c communicates with a debugger 220a, 220b and 220c, respectively. Control of the processor models 210a, 210b and 210c is handled by a scheduler 230. It will be appreciated that the scheduler does not exist in the hardware. The scheduler is a simulation artifact. The scheduler's function is to synchronize the computation of multiple simulation models so that it appears as if they are running in parallel. In the hardware environment, the operation of processors is synchronized by a clock signal. The problem with the multi-processor configuration shown in FIG. 2 is that synchronization is lost when debugging one or more processors in the multi-processor system.

Referring to FIG. 2, a loss of synchronization can be illustrated by the following example. As mentioned above, simulator 200 includes three processor models: processor model A 210a, processor model B 210b and processor model C 210c. The processor models 210a, 210b and 210c are run in debug mode using debugger A 220a, debugger B 220b and debugger C 220c, respectively. The debuggers 220a, 220b and 220c each include a display which shows the current location (address) for the execution state of the processor model 210a, 210b, and 210c, respectively. If the debuggers are put into run mode, the debug display, including the address of the current execution instruction, will not be updated until the run mode is suspended, for example by reaching a breakpoint. In this example, the scheduler 230 causes the processor models 210a, 210b and 210c to execute in lock step. For example, in a given clock cycle, processor model A 210a will execute an instruction, processor model B 210b will execute an instruction and then processor model C 210c will execute an instruction. If one of the processors encounters a breakpoint, processing for all three processor models is suspended at the end of the clock cycle. That is, all of the processors that follow the processor which encountered the breakpoint will execute an instruction in order to complete the cycle. For example, if processor model B 210B encounters a breakpoint, processor model C 210c will execute an instruction in order to complete the cycle. Upon reaching a breakpoint, the debug displays update. Therefore, the debug display for processor model B 210b will be updated when the breakpoint is encountered. Likewise, the debug display for processor model C 210c will be updated. However, the debug display for processor model A 210a will not be updated. Therefore, there is a loss of synchronization because the debug displays do not display the proper information to the user, i.e., processor model A 210a is not showing the correct address. Thus, a need exists which allows for the debugging of a multi-processor system without the loss of synchronization.

SUMMARY OF THE INVENTION

In accordance with the present invention, a system for debugging a multi-processor environment operates without loss of synchronization. The system can utilize either a simulator or an emulator. The simulator or emulator includes a scheduler in communication with a number of processor models. Each processor model is representative of a processor which will be used in the target environment, for example an integrated circuit. Each processor model communicates with a debug adapter. Preferably, each processor model communicates with a devoted debug adapter. The debug adapters also communicate with the scheduler and with the debuggers. Preferably, each debug adapter communicates with a devoted debugger.

In accordance with another aspect of the present invention, control commands are routed from the debug adapter to the scheduler and other commands are forwarded from the debug adapter to the associated processor model.

In accordance with yet another aspect of the invention, additional modules may be included in the simulator or emulator, for example, a clock gate module.

In accordance with still another aspect of the invention, communications are accomplished using Application Programming Interface (API) calls.

In accordance with a further aspect of the invention, a processor can execute multiple applications concurrently, i.e., one or more processors can multi-task.

BRIEF DESCRIPTION OF THE DRAWINGS

The subject invention will hereinafter be described in conjunction with the appended drawing figures, wherein like numerals denote like elements, and.

DETAILED DESCRIPTION OF A PREFERRED EMBODIMENT

Overview of the Environment

The present invention provides an environment suitable for developing software for multi-processor systems. As described in further detail later, the invention includes a debug adapter which works in conjunction with existing components, e.g., processor models, scheduler, debuggers, etc. to create a software development environment that allows the processor models to be debugged without having the synchronization problems of prior art multi-processor development environments. A debugger is a tool which aids a programmer or developer in locating and correcting bugs, i.e., errors. Finding and correcting errors or bugs is known as "debugging." Debuggers are known in the art. Any debugger can be used in the implementation of the present invention.

Figure 3:
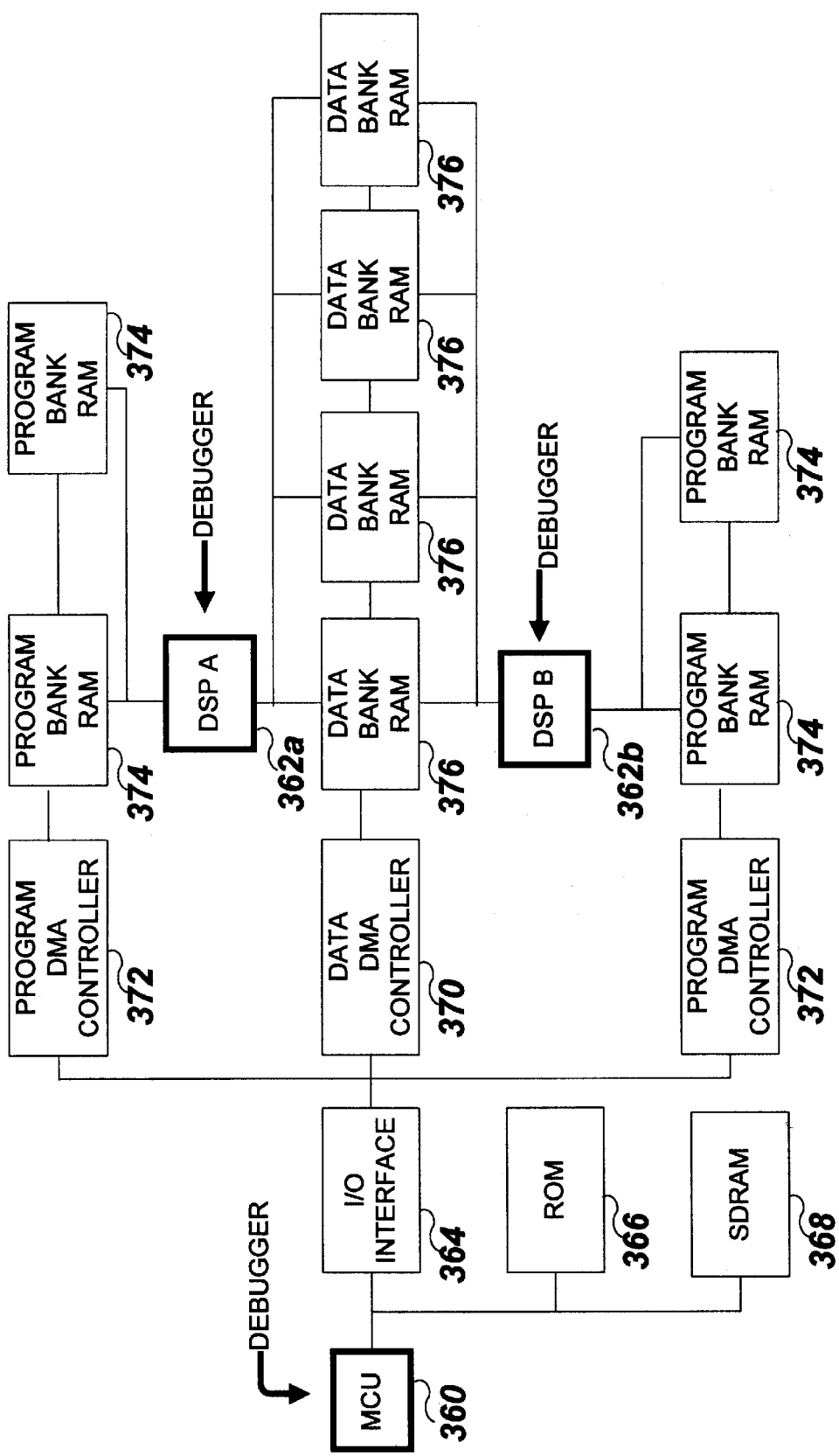
FIG. 3 is a block diagram of an exemplary multi-core system-on-a-chip simulation model which can be debugged using the simulation environment of the present invention.

FIG. 3 is a block diagram of an exemplary multi-core system-on-a-chip simulation model, i.e., an embedded system. The example simulation model shown in FIG. 3 includes several processors: a micro-controller unit (MCU) 360 and two digital signal processors (DSPs), DSP A 362a and DSP B 362b. Each of the processors 360, 362a and 362b can be debugged using a debugger. The simulation model also includes an input/output (I/O) interface 364, read-only memory (ROM) 366 and synchronous dynamic random access memory (SDRAM) 368. The exemplary simulation model shown in FIG. 3 also includes a data direct memory access (DMA) controller 370 and two program DMA controllers 372. There is also program bank random access memory (RAM) 374 which is program memory that can be switched between several processors or DMA controllers and data bank RAM 376 which is data memory that can be switched between several processors or DMA controllers. It will be appreciated that the example is illustrative and not intended to be limiting. The present invention is applicable in any multi-processor environment.

Figure 4:
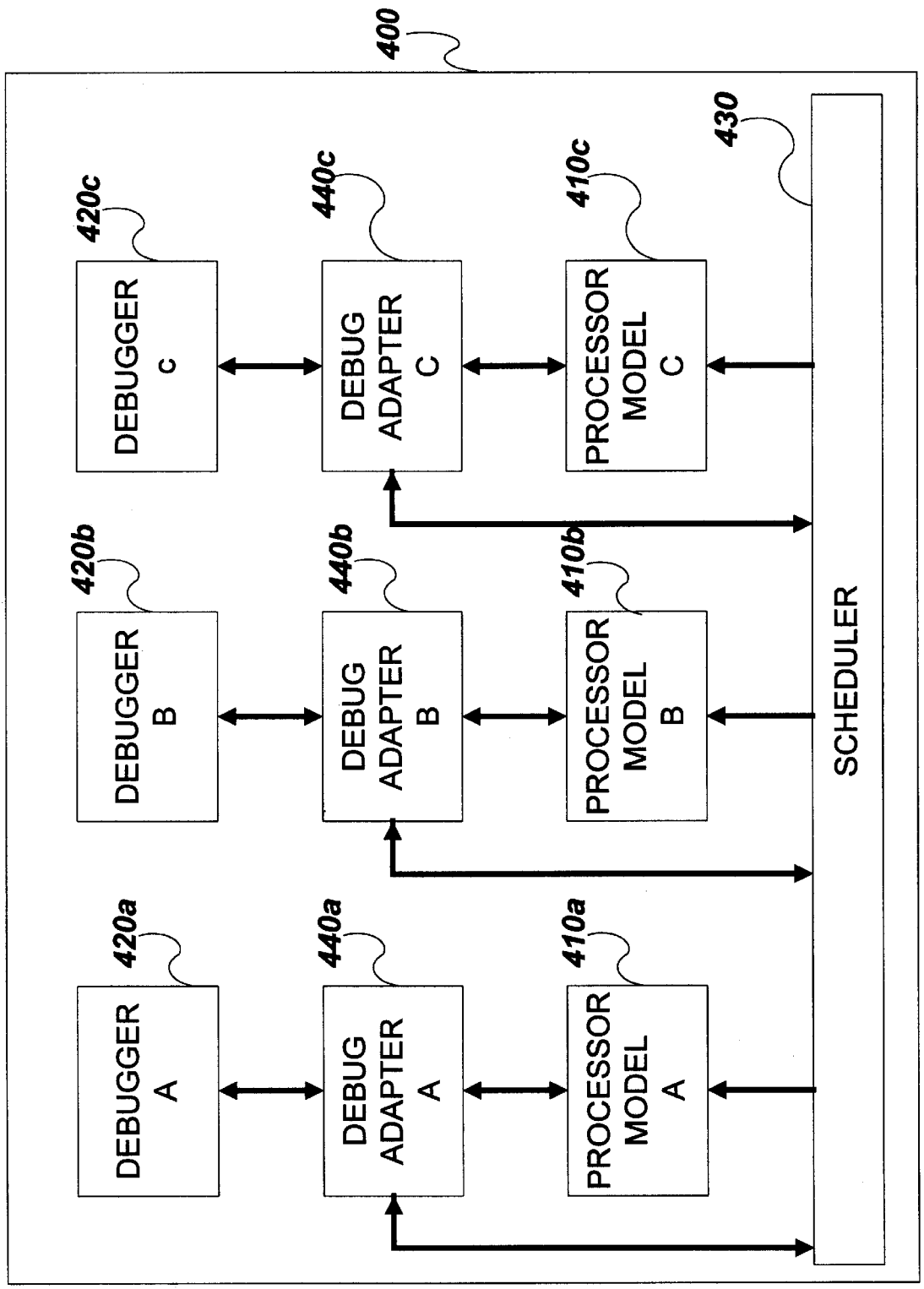
FIG. 4 is a block diagram of a synchronized multi-processor debug environment according to the present invention.

FIG. 4 is a block diagram illustrating a simulator 400, which includes a scheduler 430, multiple processor models 410a, 410b and 410c, multiple debuggers 420a, 420b and 420c and multiple debug adapters 440a, 440b and 440c configured in accordance with the present invention for debugging a multi-processor system, such as the one illustrated in FIG. 3. The embodiment shown in FIG. 4 is implemented using a simulator 400 with the simulator 400 and the debuggers 420a, 420b and 420c implemented in software. It will be appreciated that the invention can also be implemented using an emulator with the emulation device being a hardware component which includes a device driver implemented in software which communicates with one or more debuggers. Simulator 400 shown in FIG. 4 is configured for the development of the exemplary embedded system shown in FIG. 3. Simulator 400 includes three processor models 410a, 410b and 410c, with one of the processor models representing DSP A 362a, one of the processor models representing DSP B 362b and one of the processor models representing MCU 360. Thus, within the simulator 400, there can be multiple types of processor models, e.g., DSP and MCU and multiple occurrences of a given type of processor model, e.g., two DSPs. As indicated in FIG. 3, each of the processors (MCU 360, DSP A 362a and DSP B 362b) includes an associated debugger. The processor models 410a, 410b and 410c which represent the processors of FIG. 3 communicate with debuggers 420a, 420b and 420c, respectively, via debug adapters 440a, 440b and 440c, respectively. The debug adapters are the component that allows for the synchronized multi-processor debugging of the present invention, as described in further detail later. In a preferred embodiment of the invention, each debugger 420a, 420b, 420c communicates with its own debug adapter 440a, 440b, 440c via inter-process communication (IPC) over sockets using Transmission Control Protocol/Internet Protocol (TCP/IP), however, it will be appreciated that other means of communication can be used. The processors are controlled by a scheduler 430. It will be appreciated that the scheduler does not exist in the hardware. The scheduler is a simulation artifact. The scheduler's function is to synchronize the computation of the multiple simulation models so that it appears that they are running in parallel. The debug adapters 440a, 440b and 440c communicate with the scheduler 430 in order to maintain synchronization of the processors as described in detail herein.

Setting up the Simulation Environment

The various embodiments of the present invention can operate in various practical environments. One practical embodiment of the present invention uses UNIX as its operating system. In one embodiment of the present invention, the debugger is a command line debugger in which the debugger is started from an xterm window and attaches to the simulation target through an IPC connection. Alternatively a graphical user interface (GUI) may be employed. The debugger operates fully concurrently with the simulator process, i.e., it does not block when a run command is issued. Accordingly, it is possible to execute debugger commands while the simulator is running. The embodiment described herein is directed to a plurality of processor models with each processor model running a single application. It will be appreciated that one or more of the processor models could include multiple applications. In other words, the present invention can include one or more multi-tasking processor models.

Exemplary Application Programming Interface (API)

In a preferred embodiment, communications occur using API calls. The API between the scheduler 430 and the processor models 410a, 410b, 410c is primarily used for establishing connections. In one embodiment, the processor models 410a, 410b, 410c register with the scheduler. The registration defines the how the processor will be updated. For example, a processor model can request updates, recalcs or both as described in further detail later.

In one embodiment, communication between the processor models 410a, 410b and 410c and their associated debug adapters 440a, 440b and 440c, respectively, and communication between debuggers 420a, 420b and 420c and their associated debug adapters 440a, 440b and 440c, respectively, are accomplished using API calls. A debug target can be a simulator program running on a computer, or an emulation device. In the case of the emulation device, the function calls are translated into another protocol, for example, In Circuit Emulation (ICE) or JTAG 1149 which is an Institute of Electronic Engineers (IEEE) standard produced by the Joint Test Action Group (JTAG). The translation is typically done in the device driver that controls the card to which the emulation board is attached. Each debuggable object (e.g., processor model) in a target system (e.g., simulator), exposes an interface that the debugger can access. Preferably, all target data are in the target's endianness. Endianness refers to the order in which a sequence of bytes are stored in computer memory, e.g., big endian and little endian. The caller can determine the target's endianness using a get-processor-features function.

An API also exists between the debug adapters 440a, 440b and 440c and the scheduler 430. This interface supports control commands, such as step, run and halt as described in further detail below.

It will be appreciated that the APIs described above represent a preferred embodiment of the present invention and that other embodiments are possible. In a preferred embodiment of the present invention, additional interfaces are included in addition to the APIs described above. For example, a SimQuitListener interface is used for the scheduler to notify other software modules (i.e., all processor models and debug adapters) that the simulator is about to terminate, a simulatorWillRestart interface is used for the scheduler to notify other software modules (i.e., all processor models and debug adapters) that the simulator is about to restart and a simulatorStatusChanged interface is used for the scheduler to notify other software modules (i.e., all processor models and debug adapters) that the simulator status has changed, for example, from running to halted or from halted to running.

Logic/Process Flow

FIGS. 5–9 illustrate various processes that may be performed by the present invention. In the context of this description, these processes may be carried out by the debugger, the debug adapter and the scheduler. Logic for the processor model is not described in detail herein because the logic is equivalent to that of prior art debug environments.

Figure 5:
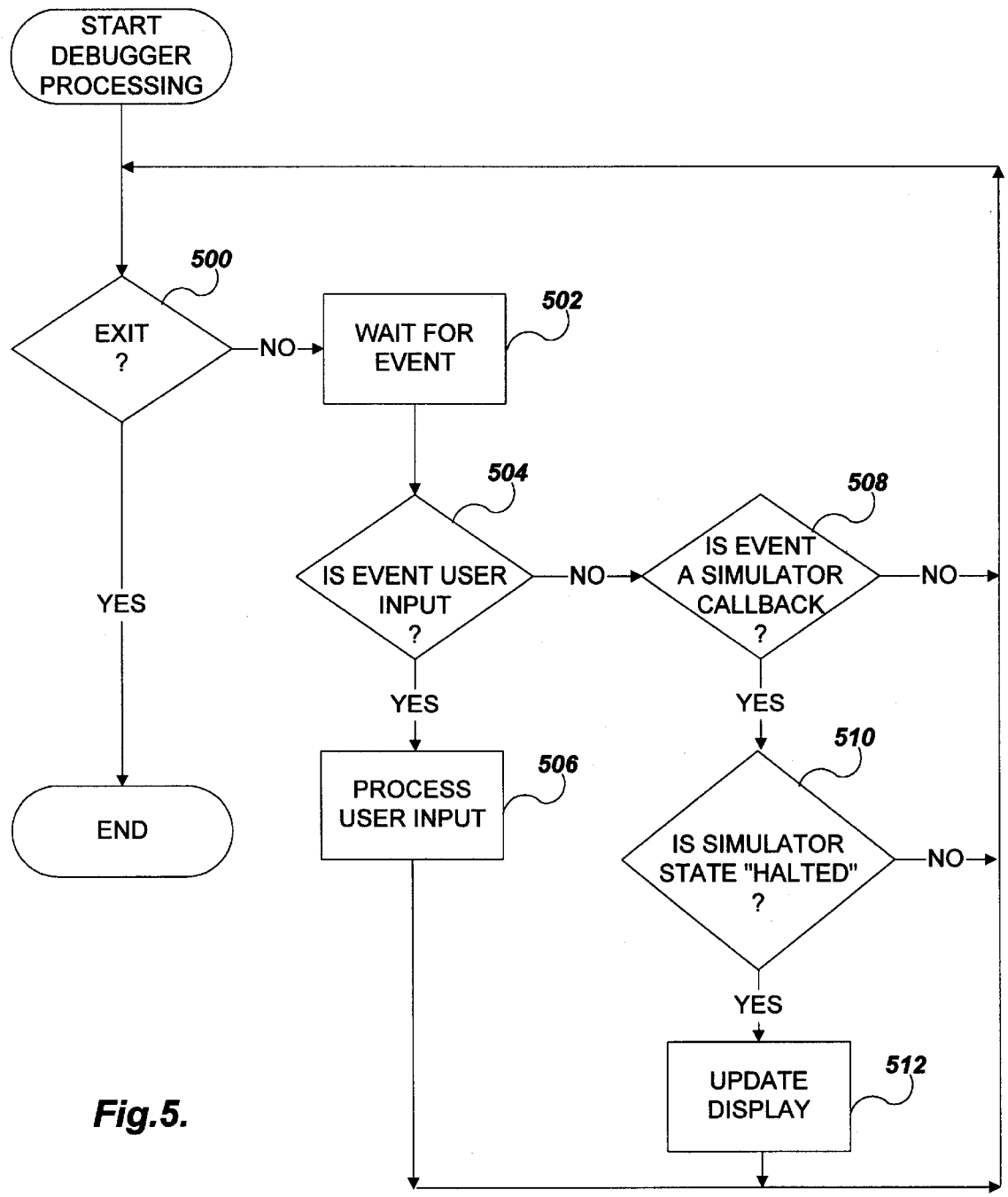
FIGS. 5–9 are flow diagrams illustrating an exemplary logic flow of the present invention.

FIG. 5 depicts a process for a debugger 420a, 420b and 420c to debug processors in a simulation environment in accordance with the present invention. It will be appreciated that the logic described herein with reference to FIG. 5 is performed by each of the debuggers 420a, 420b and 420c. The logic moves from a start block to decision block 500 where a test is performed to determine if the debugger should exit, i.e., terminate processing. For example, the debugger may receive an exit notification from the scheduler. If it is not time to exit, the logic moves to block 502 to wait for an event. An event is an occurrence that requires processing. Preferably, an interrupt notifies the debugger that an event has occurred. Upon receipt of an event, the event is processed. An event may be a user input or a simulator callback. A simulator callback is a debugger function that is called by another process using an API call. If it is determined in decision block 504 that the event is a user input, the logic proceeds to block 506 where the user input is processed. Exemplary debugger commands that can be entered by the user are described later. After the user input is processed, the logic returns to block 500.

If the event is not user input as determined in decision block 504, the logic moves to decision block 508 where a test is made to determine if the event is a simulator callback. If so, the logic moves to decision block 510 where a test is made to determine if the simulator state is "halted,", i.e., not "running." If the simulator state is not "halted," the logic returns to decision block 500. However, if the simulator state is "halted," the logic moves to block 512 where the debugger display is updated. The update of the debugger display depends on how the debugger is configured. For example, if the debugger display is configured to display the memory location of the executing instruction, the display will be updated to reflect the current memory location of the executing instruction. The logic then returns to decision block 500. It will be appreciated that each debugger can continuously process events (e.g., user inputs and simulator callbacks) until it is time to exit, at which point the debugger exits and processing ends.

Figure 6:
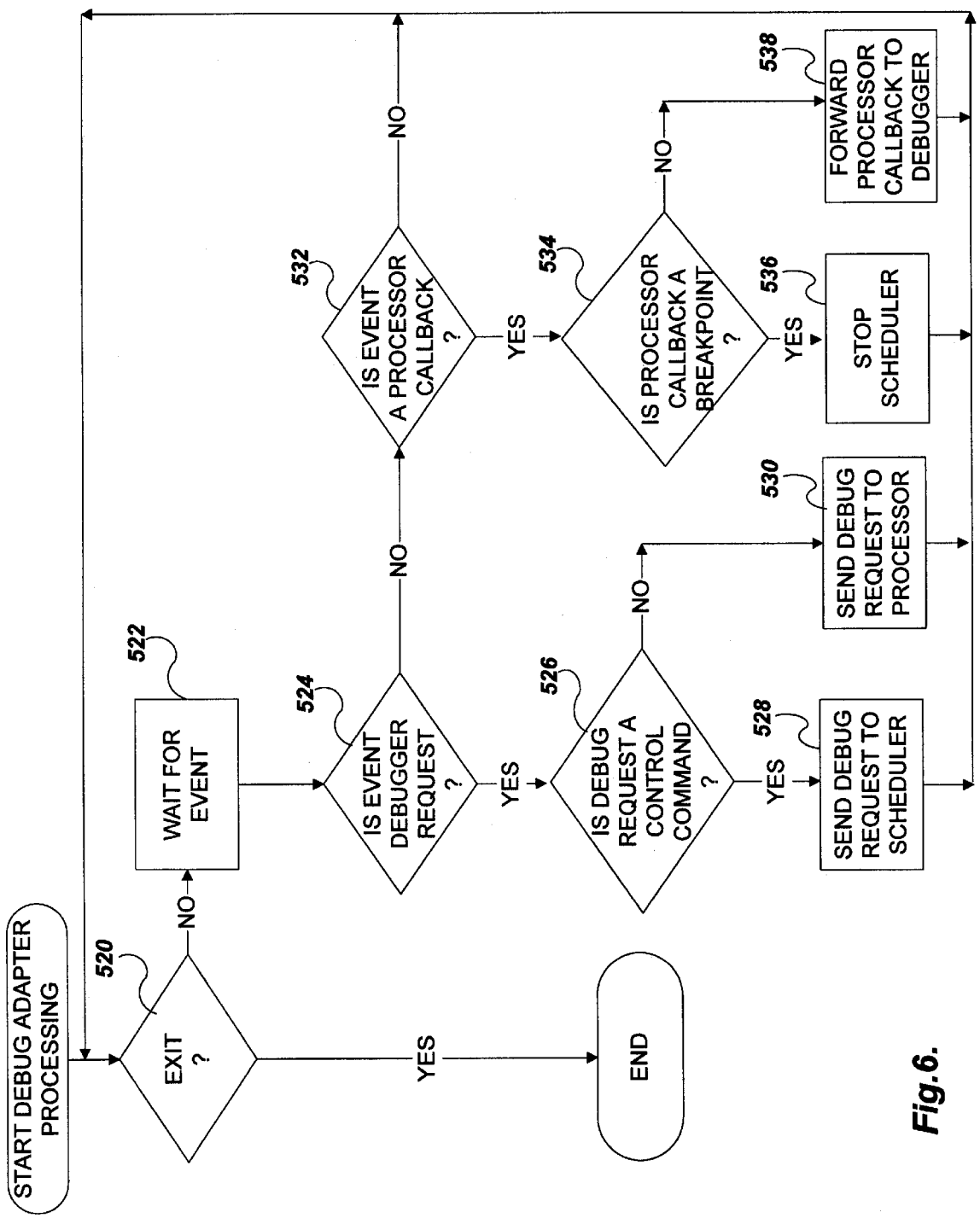

FIG. 6 illustrates a process performed by a debug adapter 440a, 440b and 440c. A debug adapter acts as an intermediary between a processor 410a, 410b and 410c and a debugger 420a, 420b and 420c, respectively. That is, messages which are communicated directly between a debugger and a processor in a prior art development system communicate via a debug adapter 440a, 440b and 440c in the present invention. The debug adapter acts as a pass through filter under these circumstances by forwarding messages between the debugger 420a, 420b and 420c and the processor 410a, 410b and 410c. However, under certain circumstances, the debug adapter will redirect messages, for example, by sending control messages to the scheduler. It will be appreciated that the logic of FIG. 6 described herein is performed by each of the debug adapters 440a, 440b and 440c in the present invention. The logic moves from a start block to decision block 520 where a test is made to determine if it is time to exit. For example, the debugger may receive an exit notification from the scheduler. If it is not time to exit, the logic moves to block 522 to wait for an event. Upon receipt of an event (e.g., a debugger request or a processor callback), the event is processed. For example, a debugger request may result from a user command, such as those described later. If it is determined in decision block 524 that the event is a debugger request, the logic moves to decision block 526 where a test is made to determine if the debug request is a control command, such as those described later. If so, the logic moves to block 528 where the debug request is sent to the scheduler. If not, the logic moves to block 530 where the debug request is forwarded to the processor. After sending the debug request to the appropriate destination (i.e., the scheduler or the processor), the logic returns to decision block 520.

If the event is not a debugger request, the logic moves to decision block 532 where a test is made to determine if the event is a processor callback. A processor callback is a function initiated by a processor. If the event is a processor callback, the logic proceeds to decision block 534 where a test is made to determine if the processor callback is a breakpoint. If so, the processor has reached an instruction at which the user requested that the processing halt, and the logic moves to block 536 where the scheduler is stopped. Stopping the scheduler causes the state to be set to "halted." If the processor callback is not a breakpoint, the logic moves from decision block 534 to block 538 where the processor callback is forwarded to the debugger. The logic then returns to decision block 520. In this manner, events (e.g., debugger requests and processor callbacks) are processed until an exit is prompted, at which point the debug adapter exits and processing ends.

Figure 7:
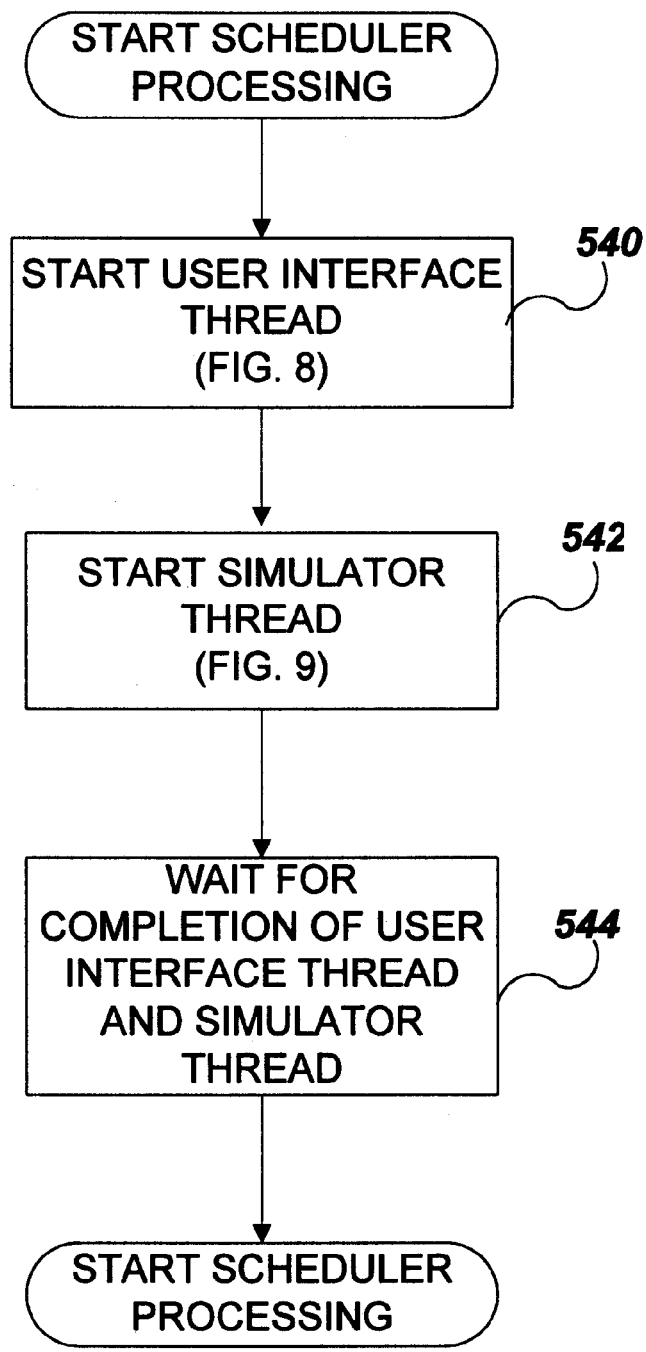

FIG. 7 illustrates the general operation of scheduler 430. The scheduler 430 starts two threads: a user interface thread and a simulator thread. In computer programming, a thread is a placeholder for information associated with a single use of a program that can handle multiple concurrent users. If multiple users are using the program or concurrent requests from other programs occur, a thread is created for each of them. The logic of FIG. 7 moves from a start block to block 540 where a user interface thread is started. Exemplary logic for a user interface thread is illustrated in detail in FIG. 8 and described below. A simulator thread is also started (block 542). Exemplary logic for a simulator thread is shown in FIG. 9 and described later. After the user interface thread and the simulator thread are started, the scheduler waits for the completion of these threads (block 544). When the threads have completed, the logic shown in FIG. 7 ends.

Figure 8:
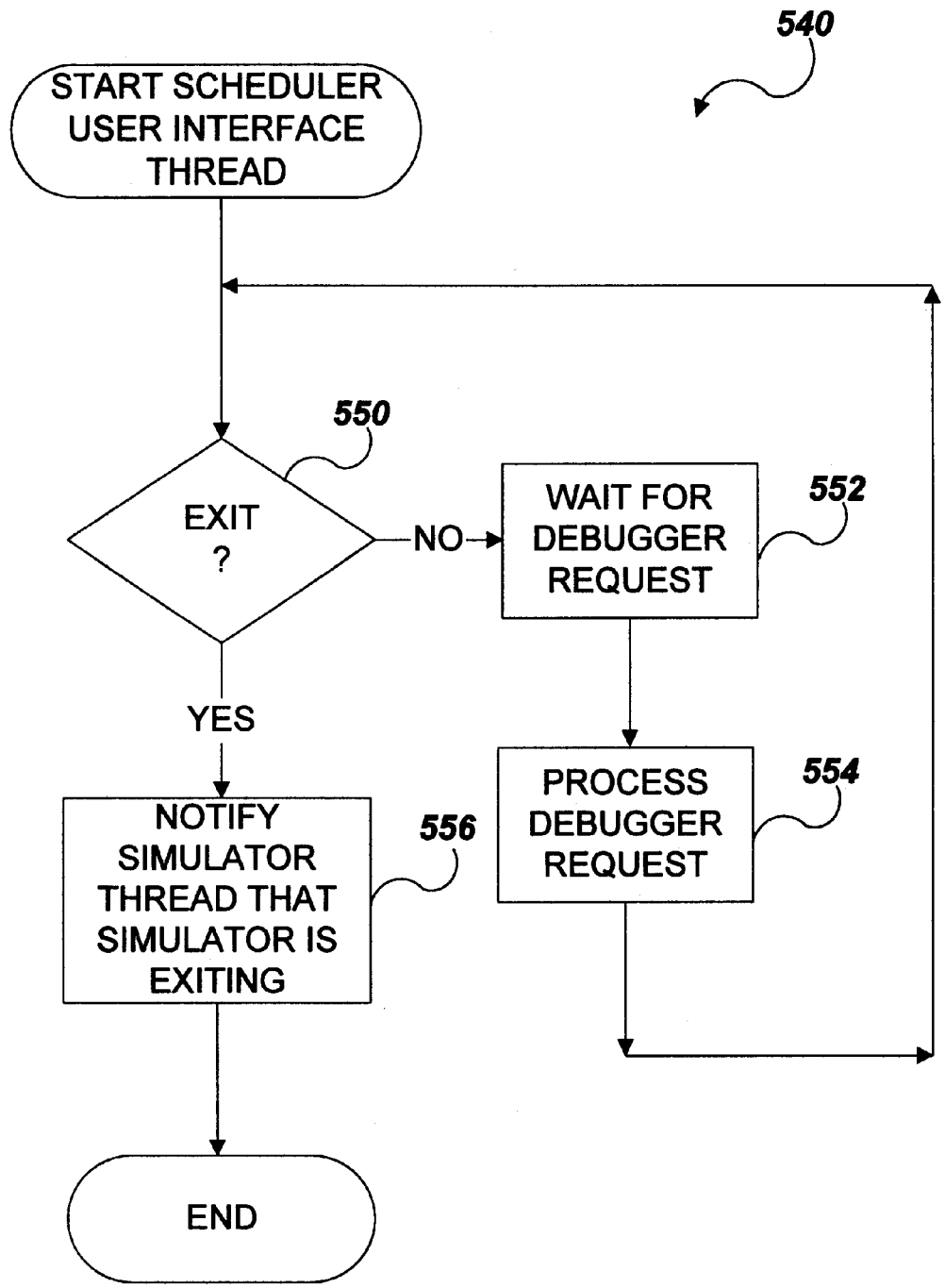
Figure 9:
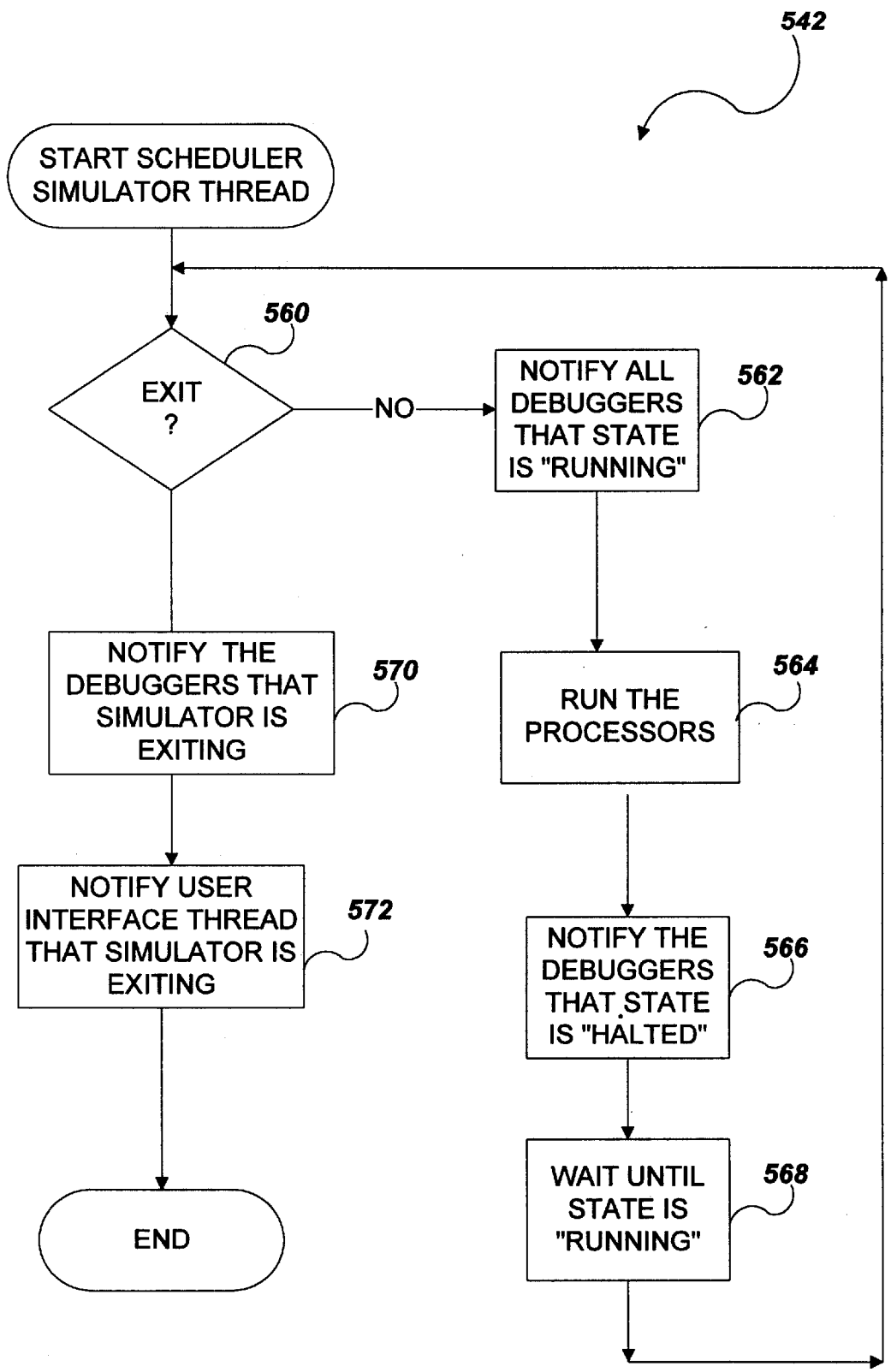

A process performed by the scheduler user interface thread is shown in detail FIG. 8. The logic of FIG. 8 moves from a start block to decision block 550 where a test is made to determine if it is time to exit. If not, the logic moves to block 552 to wait for a debugger request. Upon receipt of a debugger request, the logic moves to block 554 where the debugger request is processed. The logic then returns to decision block 550. In this manner, debugger requests are processed until it is time to exit. When it is time to exit (yes in decision block 550), the logic moves to block 556 where the simulator thread is notified that it is time to exit. The logic of FIG. 8 then ends.

An exemplary process performed by the scheduler simulator thread is shown in FIG. 9. The process moves from a start block to decision block 560 where a test is made to determine if it is time to exit. If not, the logic moves to block 562 where the debuggers are notified (via the debug adapters) that the state is "running." Next, the logic moves to block 564 where the processors are run. In a preferred embodiment of the present invention, a "step" refers to a master clock cycle, as described in further detail below. Thus, a "step" could be performed by putting a processor in run mode for one master clock cycle. Next, in block 566 the debuggers are notified (via the debug adapters) that the state is "halted." The logic then moves to block 568 where the scheduler simulator thread waits until the state is "running." When the processor state is "running," the logic returns to decision block 560. In this manner, synchronized running (which can be in "step" mode) of all processors continues until it is time to exit. When it is time to exit, the logic moves from decision block 560 to block 570 where the debuggers are notified that the simulator is exiting. The logic then moves to block 572 where the user interface is notified that the simulator is exiting. The logic of FIG. 9 then ends.

Description of Stepping

In a preferred embodiment of the invention, and herein, a "step" in the system simulation environment refers to a master clock cycle. However, it will be appreciated that a step can be measured in other ways, for example, a step could be one line of code in a high level programming language program, such as a C program, which in turn translates into multiple machine instructions. A machine instruction could translate into multiple clock cycles. Alternatively, a step could be defined as a single machine instruction, etc.

For each master clock cycle, the scheduler 430 activates each clocked component, (e.g., processor model 410a, 410b and 410c) twice: the first activation is the update cycle, and the second activation is the recalc cycle. As stated above, a processor can be configured for updates only, recalcs only or both updates and recalcs. In the example described herein, all three processor models are configured for both updates and recalcs. In the update cycle, the processor models 410a, 410b and 400c update their registers. In the recalc cycle, the processor models 410a, 410b and 410c recompute their logic gates (combinatorial logic). In this context, one iteration of the simulation loop for the three processor system is:

processor_a→update( );
processor_b→update( );
processor_c→update( );
processor_a→recalc( );
processor_b→recalc( );
processor_c→recalc( );

If a user issues a step command in any of the debuggers 420a, 420b or 420c, the step command is translated into one system master clock cycle. For the example described herein, the master clock cycle is equivalent to one iteration of the simulation loop as shown above. Synchronization is accomplished using API calls for notifications of mode changes which indicate when the simulator has started running or stopped. Single stepping is implemented by putting the simulator into run mode for one cycle. In run mode, iterations of the simulation loop are continuously performed, i.e., a series of continual steps are performed.

The observation point (i.e., the point at which a debugger can update its display) is always after the last recalc, i.e., processor_c→recalc( ). Because all of the computations (processor_a→update( ) through processor_c→recalc ( ) happen concurrently in the actual hardware, it is not possible to observe the actual system in the intermediate states. The two phase computation scheme (i.e., update and recaic) avoids the serialization artifact. The serialization artifact refers to the incorrect simulation results that are caused by the sequential computation of simultaneous hardware events. This can be illustrated by an example in which processor model A 410a reads a register of processor model B 410b. With a one-phase computation scheme with one activation per clock cycle, the result of the read depends on the order of computation. If processor model A 410a comes first, it would read the register value of processor model B 410b of the previous clock cycle. But, if processor model B 410b comes first, processor model A 410a would read the register value of processor model B 410b of the current clock cycle. In contrast, with a two-phase computation scheme, all registers are updated in the first activation. Only in the second phase are the processors allowed to access other components. This is accomplished using double buffering in order to maintain two copies of all register values: the current value and the next value.

Operational Examples

Tables I–V below illustrate standard debug commands. These are commands that a user enters into the user interface of the debugger. Table I illustrates some exemplary breakpoint commands. In traditional multi-processor debugging environments, breakpoint commands are communicated directly between the debugger and the processor model. In the present invention, breakpoint commands are preferably communicated between the debugger and the processor model via a debug adapter. In these cases, the debug adapter is merely acting as a pass-through filter.

TABLE I

Breakpoint Commands

| Command | Description |
| --- | --- |
| create-breakpoint | Creates an execution breakpoint. The simulator is halted when the processor executes the instruction at the specified program memory location address. Breakpoints can also be set as: value watchpoints which cause a break in execution when a specified memory address assumes a specified value; read access watchpoints which cause execution to halt when the processor reads from the specified address in memory space; or write access watchpoints which cause processing to halt when the processor writes to a specified address in memory space. The exact time at which the processor is halted can vary from architecture to architecture. Typically the simulation is halted when the specified instruction enters the execute pipeline stage. |
| delete-breakpoint | Deletes the specified breakpoint. |
| get-breakpoints | Displays the breakpoints which are currently set in the target. |
| enable-breakpoint | Enables a specified breakpoint. |
| disable-breakpoint | Disables a specified breakpoint. |

Figure 1:
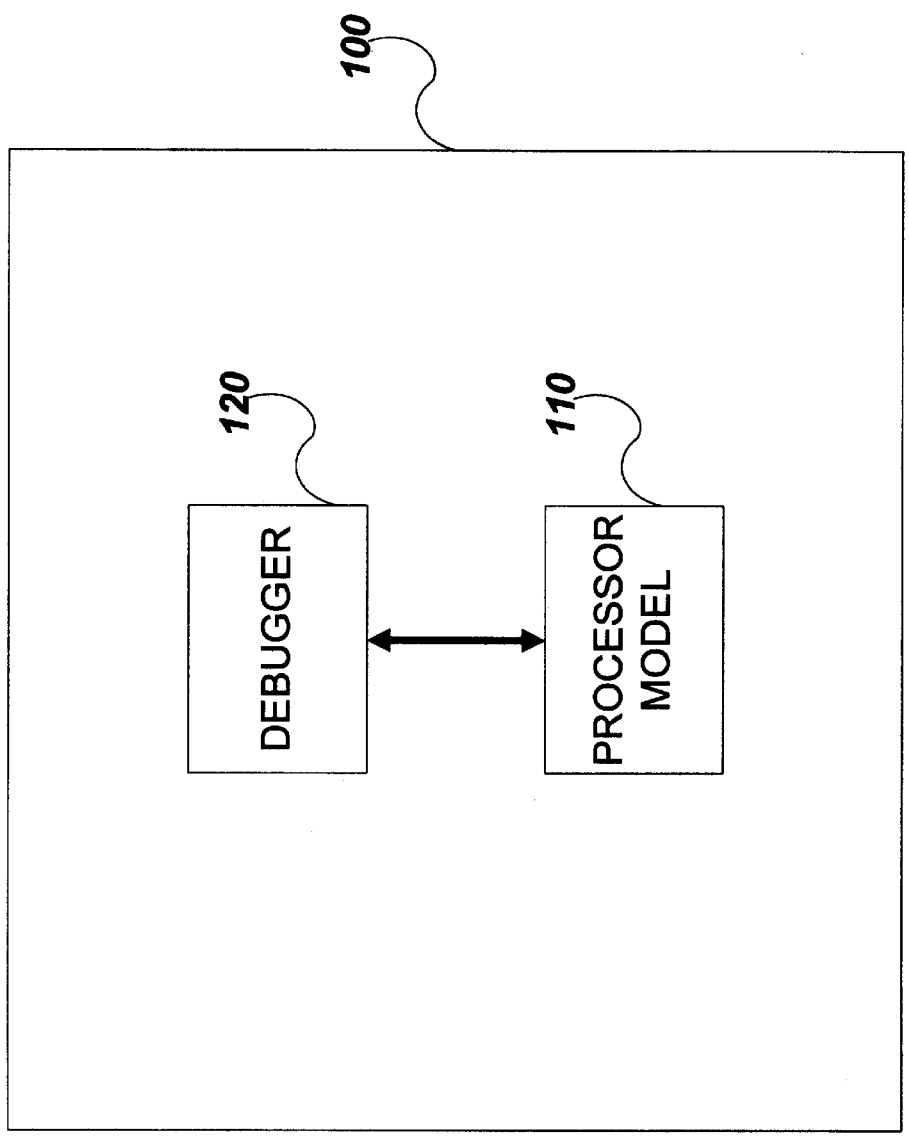
FIG. 1 is a block diagram of a single processor debug environment known in the art.
Figure 2:
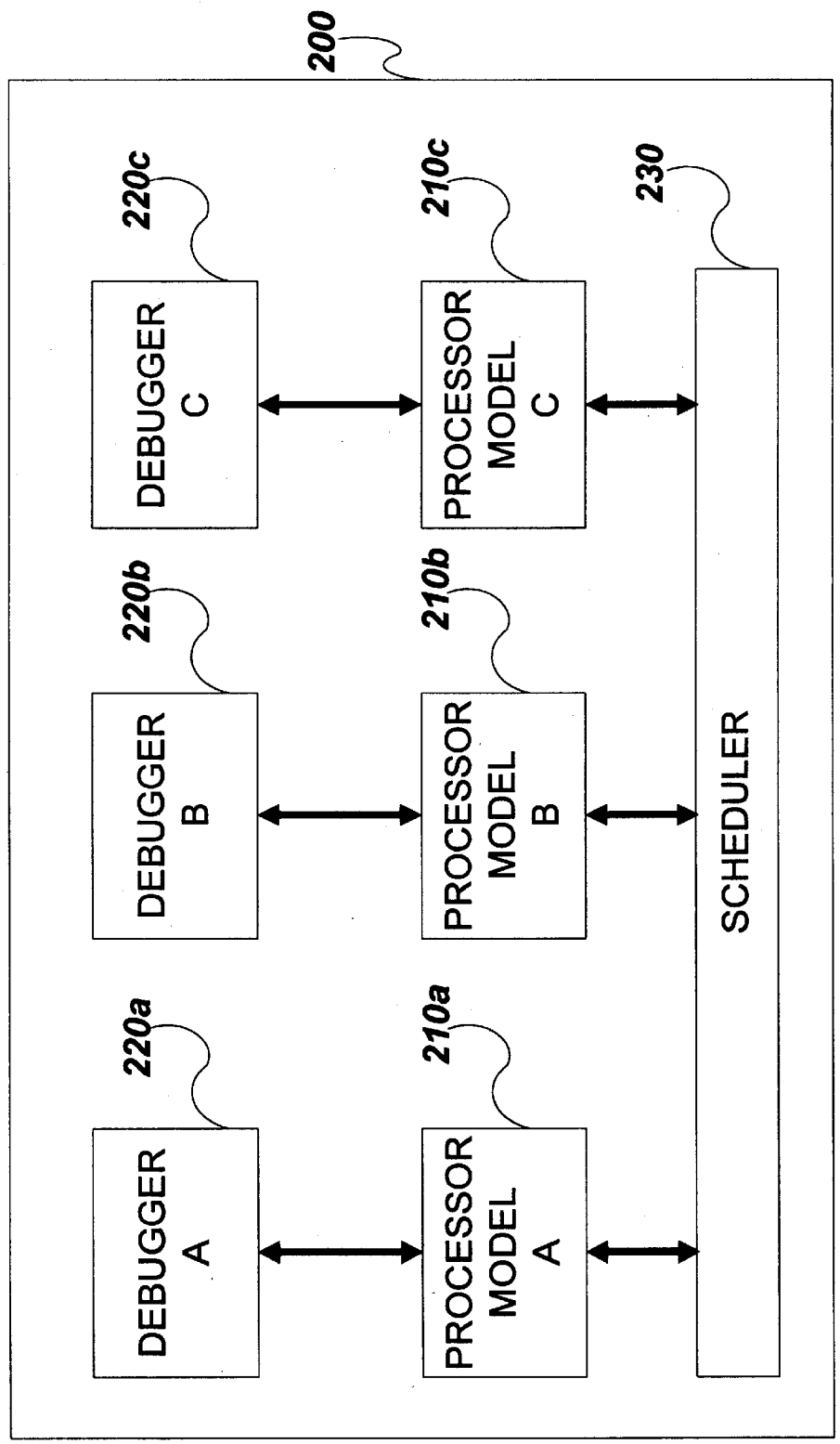
FIG. 2 is a block diagram of a multiple processor debug environment known in the art.

In the prior art multi-processor environment, as shown in FIG. 2, the debug commands will be communicated to the processor model. In the present invention, as shown in FIG. 4, debug adapters act as a pass-through filter and forward some commands to the processor model 410a, 410b and 410c. However, control commands, such as those shown in Table II, are routed from the debug adapter 440a, 440b and 440c to the scheduler 430 in order to maintain synchronization.

TABLE II

Control Commands

| Command | Description |
| --- | --- |
| run | Puts the simulator into run mode. In run mode, the simulator will advance simulation by single stepping the components in the system model in lock-step until a break condition is detected or a break command is issued by the user. |
| break | A break command puts the simulator into halt mode. This causes a synchronization notification to be sent to the attached debuggers. |
| step | Advances the processes by a "step." A step can designate different things, for example, a clock step or an instruction step. An instruction step may require multiple clock steps. In a preferred embodiment, a "step" is a clock step and if no cycle count is specified, the command advances the simulation by one clock cycle of the target, otherwise simulation is advanced the specified number of clock cycles. |
| step-into | Steps into a function. |
| step-up | Steps out of a function. |
| reset | Resets the system. |

Table III illustrates standard processor state access commands. In the context of the present invention, the debug adapter acts as a pass-through filter and forwards processor state access commands to the processor model.

TABLE III

Processor State Access Commands

| Command | Description |
| --- | --- |
| get-memory | Displays the contents of the specified memory space. |
| set-memory | Sets memory in the specified memory space to the specified value. |
| get-register | Displays the value of the specified register. |
| set-register | Sets the specified register to the specified value. |

Table IV illustrates standard processor information access commands. In the context of the present invention, the debug adapter acts as a pass-through filter and forwards processor information access commands to the processor model.

TABLE IV

Processor Information Access Commands

| Command | Description |
| --- | --- |
| get-processor-features | Retrieves a list of attributes from the processor that described the hardware architecture and debug capabilities of the processor model, for example, endianness. |
| get-registers | Retrieves and displays a description of the processor's registers, for example, names, types, functions and sizes of the registers. |
| get-memory-spaces | Retrieves and displays a description of the processor's memory spaces, for example, names, type and size. |
| get-memory-segments | Retrieves and displays a description of the segments of a selected memory space, for example, address range, access restriction and names. |

Table V illustrates standard trace commands. In the context of the present invention, the debug adapter acts as a pass-through filter and forwards trace commands to the processor model. Trace commands may require translation into multiple single steps by the debugger or the debug adapter.

TABLE V

Trace Commands

| Command | Description |
| --- | --- |
| configure-trace | Configures the trace parameters. |
| enable-trace | Enables the trace function. |
| disable-trace | Disables the trace function. |
| get-trace-result | Retrieves and displays the trace data that has been collected by the trace module. |

Figure 10:
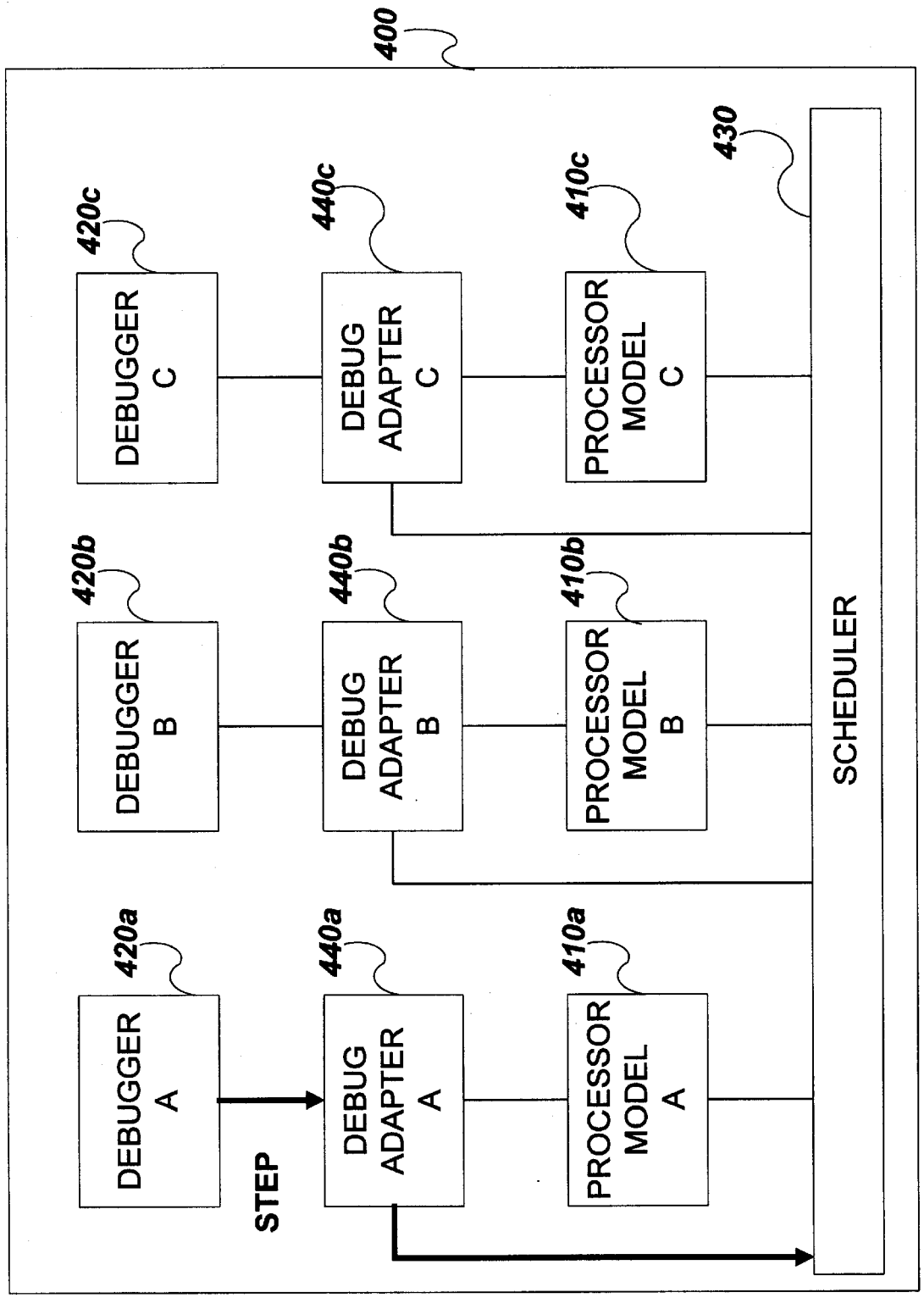
FIGS. 10–12 illustrate a processing sequence of a step command performed in accordance with the present invention.
Figure 11:
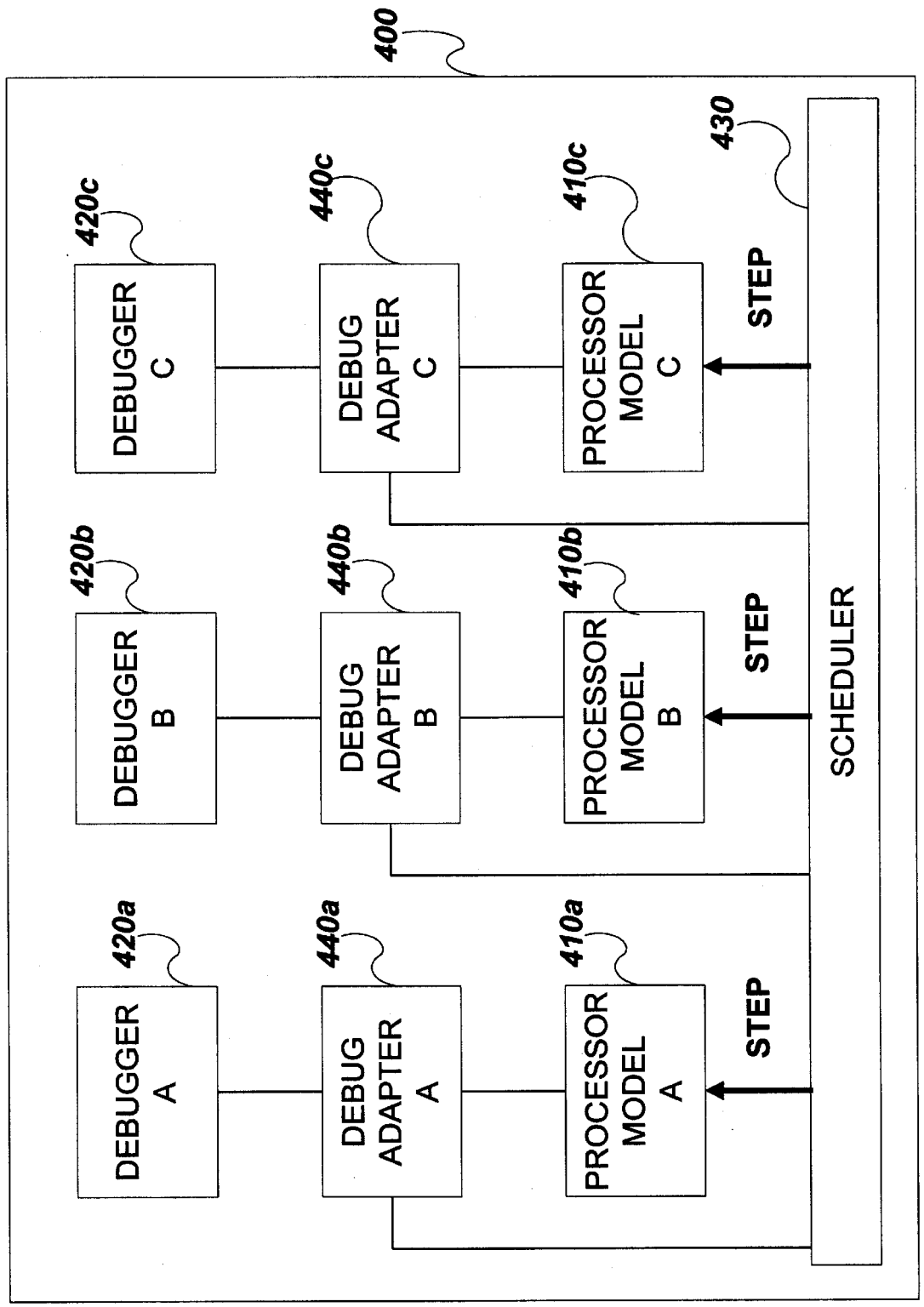
Figure 12:
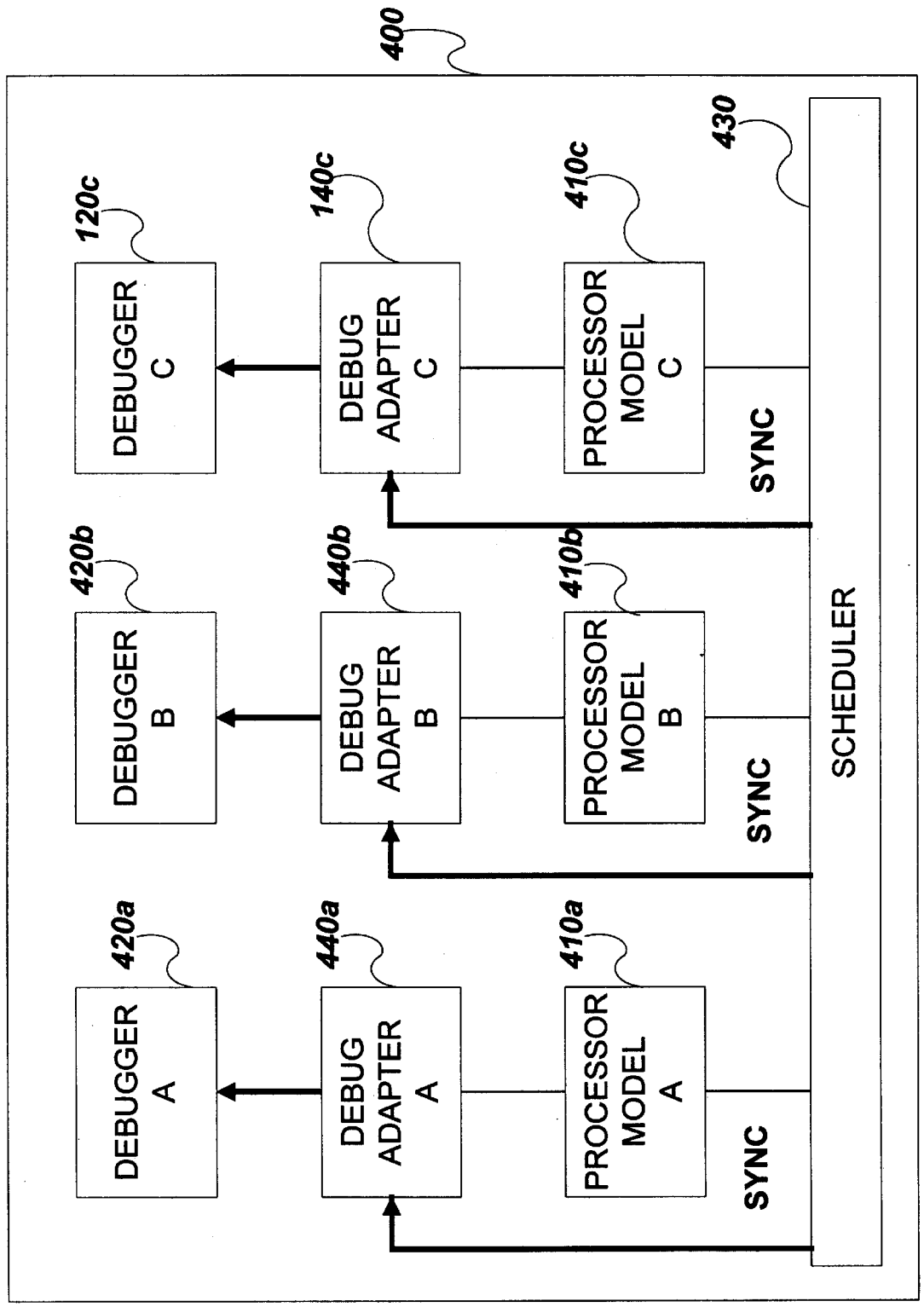

FIGS. 10–12 illustrate the processing sequence of a step command performed in accordance with the present invention. Using a suitable user interface, a user issues a step command to a debugger. For example, a user issues a step command to debugger A 420a. As shown in FIG. 10, Debugger A 420a forwards the step command to its debug adapter 440a. Debug adapter A 440a routes the step command to the scheduler 430. Next, as shown in FIG. 11, the scheduler 430 issues a step command to the processor models 410a, 410b and 410c. After issuing the step command to the processor models 410a, 410b and 410c, the scheduler 430 issues a synchronization (sync) command to the debug adapters 440a, 440b and 440c as shown in FIG. 12. The debug adapters then forward the sync command to their associated debuggers. The debugger then refreshes its debug display to reflect the current state of the debug target (i.e., processor) based on the current debugger configuration parameters, e.g., display memory contents, display registers, etc.

Figure 13:
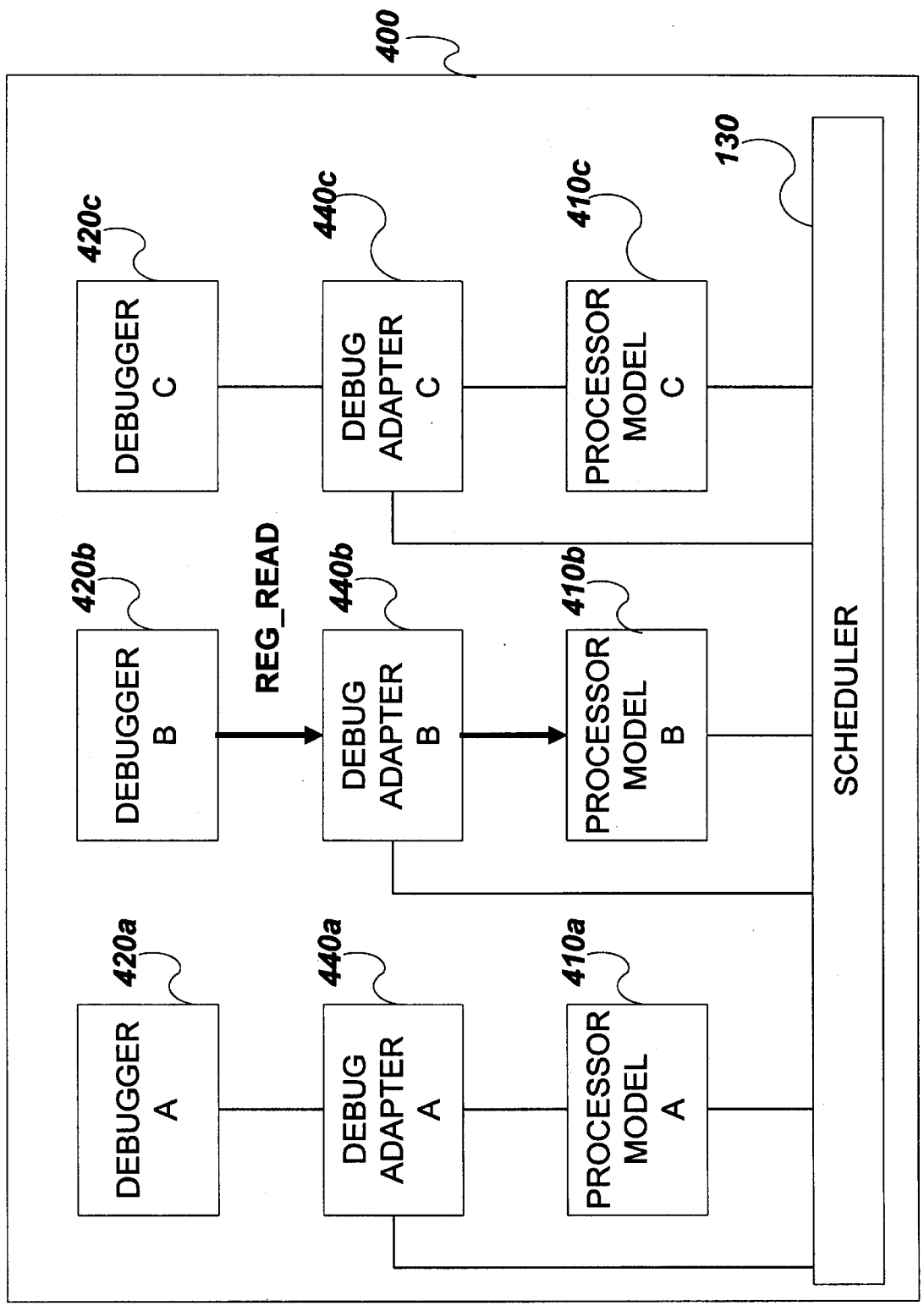
FIGS. 13–14 illustrate a processing sequence of a register read command performed in accordance with the present invention.
Figure 14:
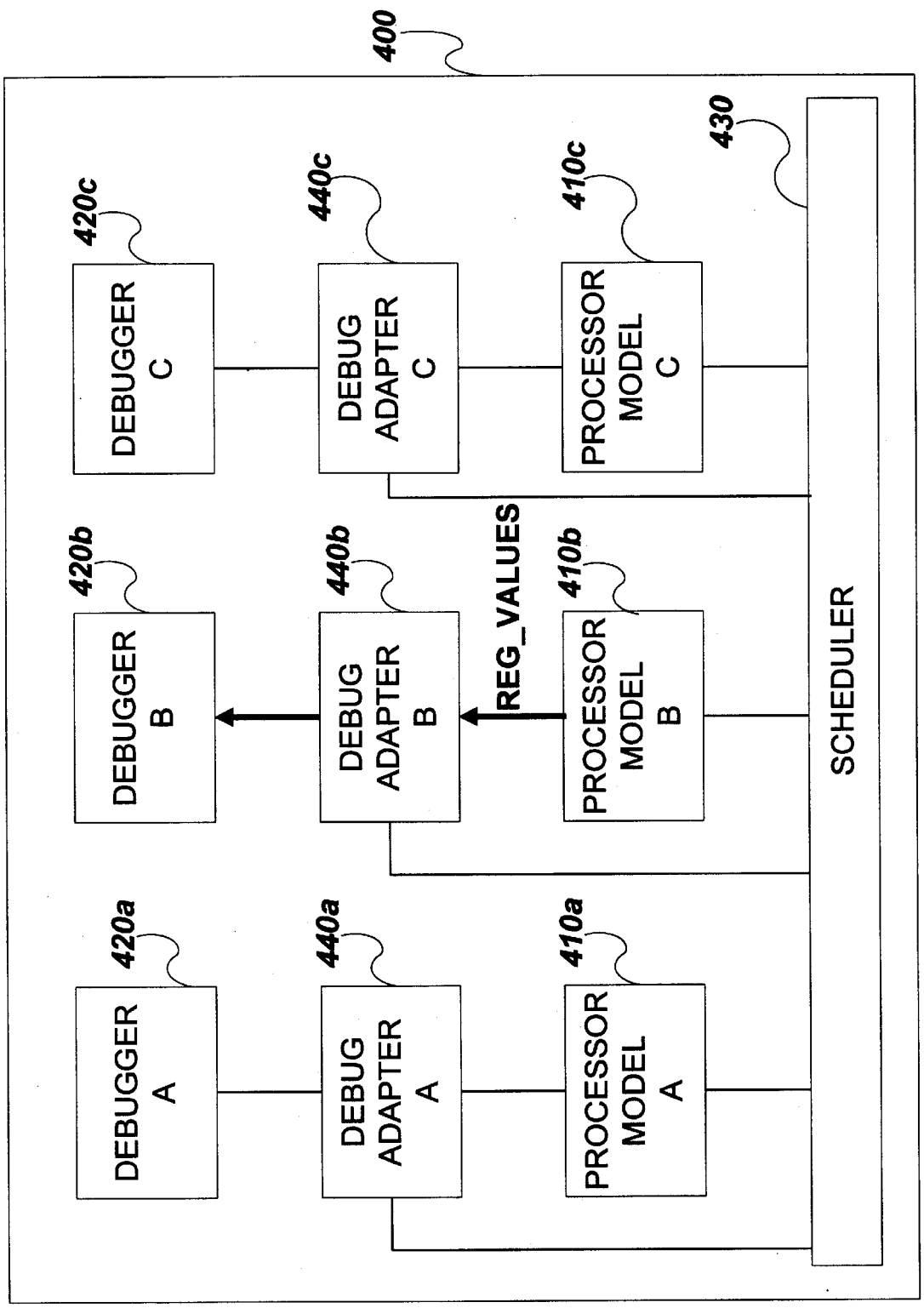

FIGS. 13–14 illustrate the processing sequence of a register read command performed in accordance with the present invention. As shown in FIG. 13, a register read command is requested by a user via debugger B 420*b*. Debugger B 420*b* forwards the register read command to debug adapter B 440*b*, which in turn forwards the request to processor model B 410*b*. Next, as shown in FIG. 14, processor model B 410*b* sends the requested register values to debug adapter B 440*b*, which then forwards the register values to debugger B 420*b*. Debugger B 420*b* then displays the register values. In this example, the debug adapter is acting as a pass-through filter and forwarding the non-control command and response between the debugger and processor model.

Figure 15:
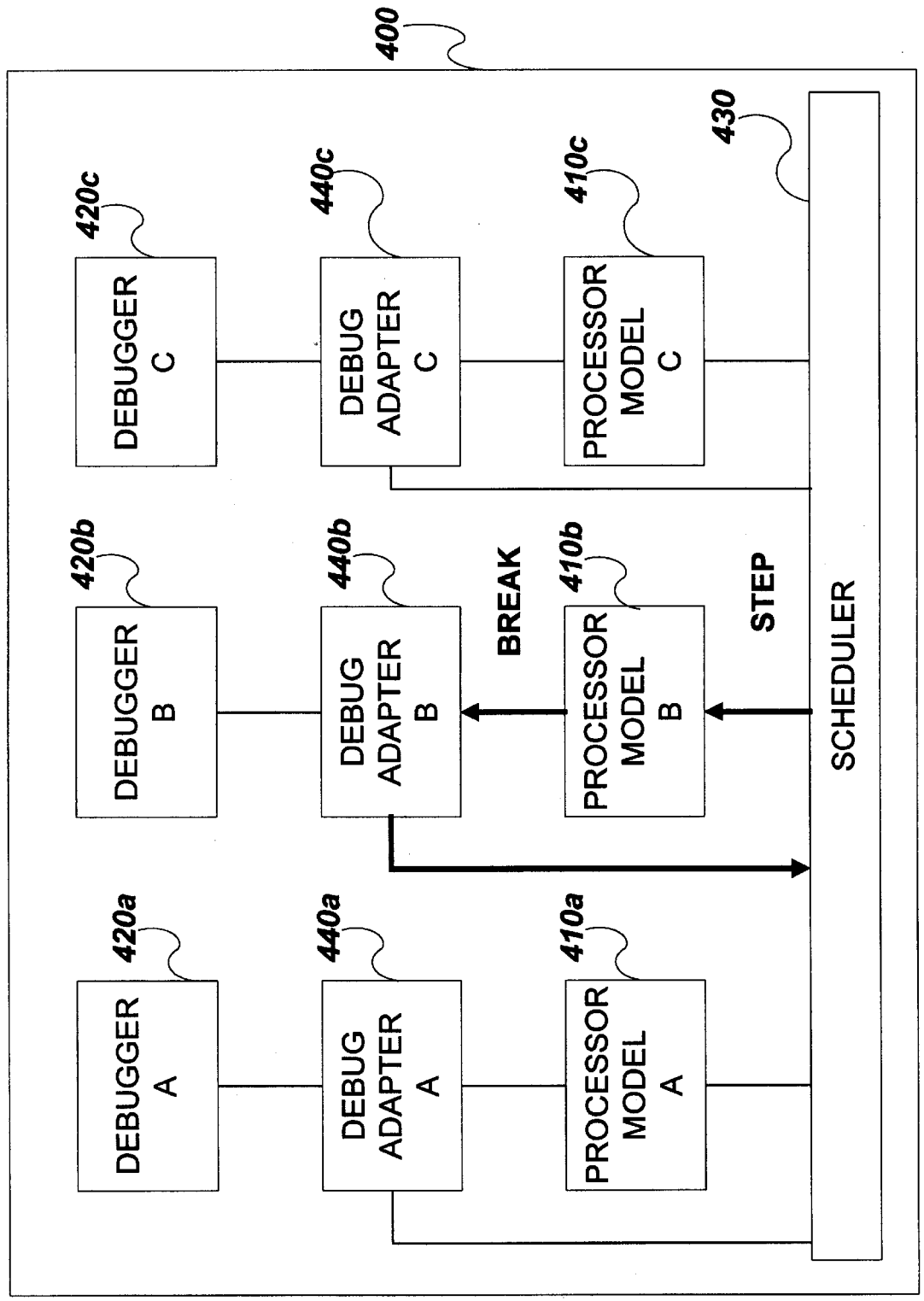
FIGS. 15–17 illustrate a processing sequence when a break on a breakpoint is encountered performed in accordance with the present invention.
Figure 16:
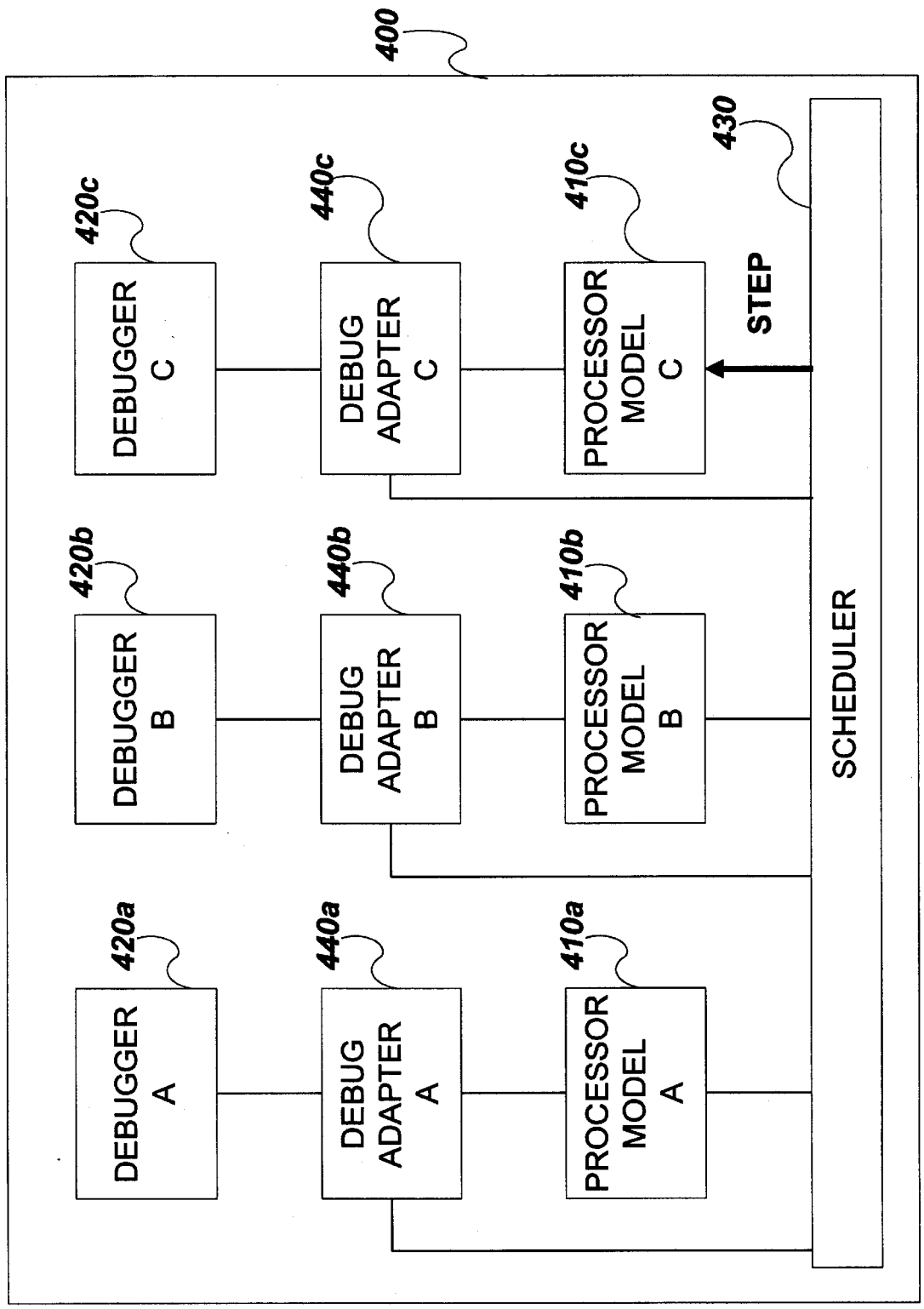
Figure 17:
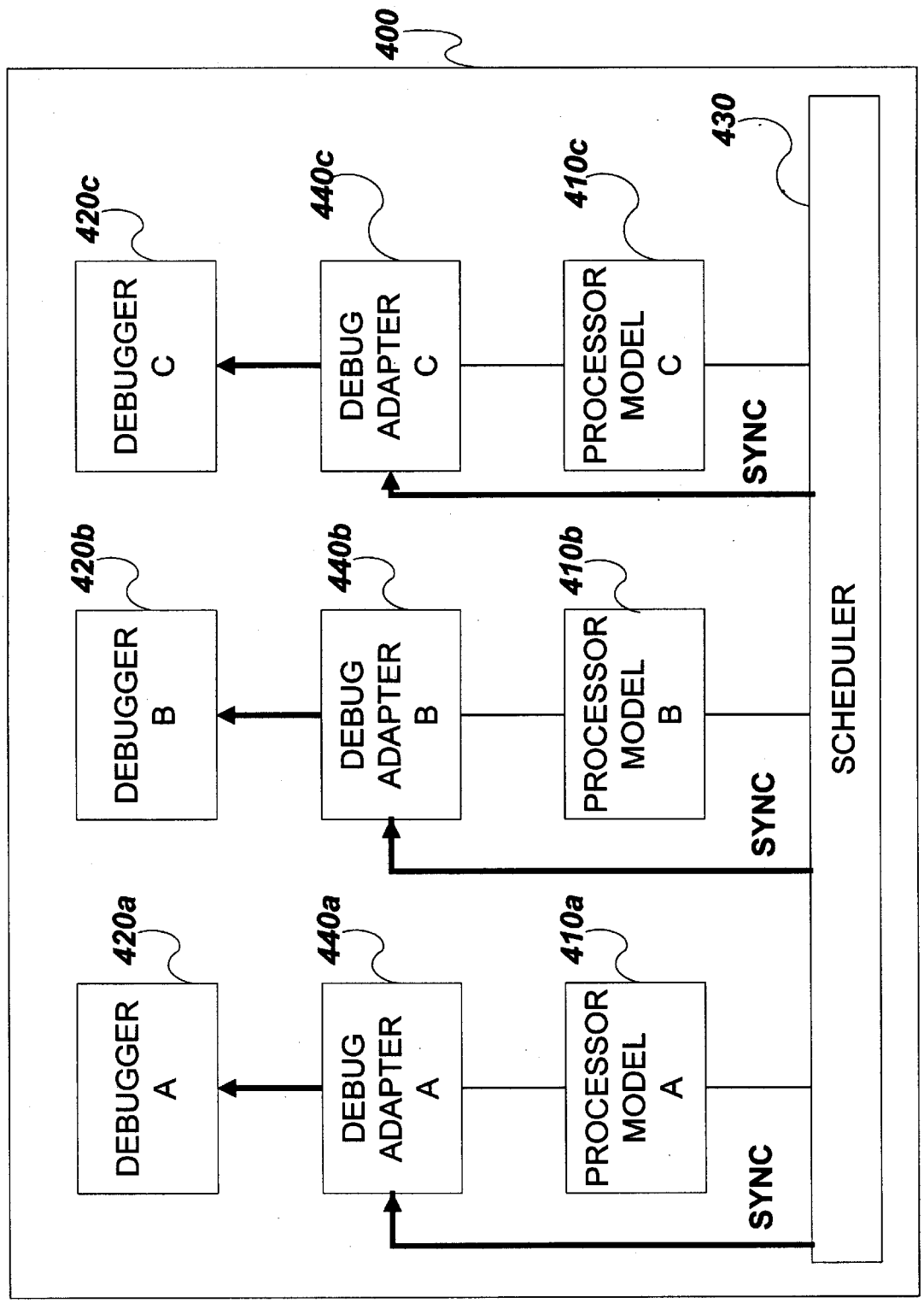

FIGS. 15–17 illustrate the processing sequence when a break on a breakpoint is encountered. Referring to FIG. 15, the scheduler issues a step command to processor model B 410*b*. It will be appreciated that a run command could have been issued instead of a step command. When a step command causes the processor model 410*b* to encounter a breakpoint, the processor model 410*b* sends a break command to its associated debug adapter 440*b*. The debug adapter 440*b* then forwards the break command to the scheduler 430 The clock cycle is then completed by the scheduler 430 issuing a step command to the remaining processor models 410*c*. For example, as shown in FIG. 16, if the breakpoint is encountered by processor model B 410*b*, a step command is issued to processor model C 410*c* in order to complete the clock cycle. The scheduler 430 then issues a sync command to the debug adapters 440*a*, 440*b* and 440*c* as shown in FIG. 17. Each debug adapter 440*a*, 440*b* and 440*c* forwards the sync command to its debugger 420*a*, 420*b* and 420*c*, respectively.

Figure 18:
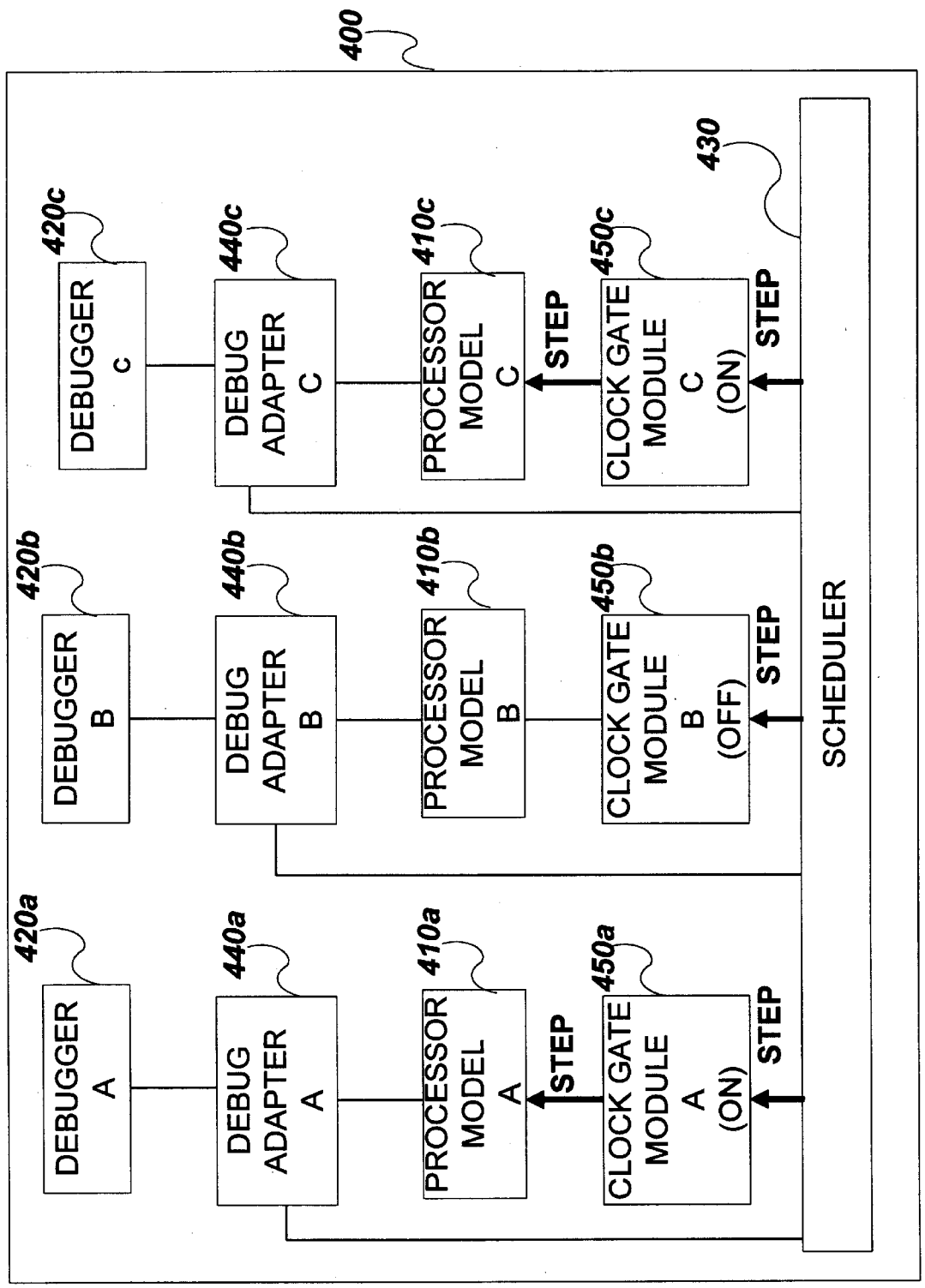
FIG. 18 illustrates the use of clock gate modules to selectively turn off individual processors.

The present invention allows for the inclusion of additional modules. For example, a clock gate module as shown in FIG. 18 can be included to selectively halt processor models. The environment shown in FIG. 18 includes all of the modules shown in FIG. 4. Additionally, FIG. 18 includes clock gate modules 450*a*, 450*b* and 450*c* in communication with the scheduler 430 and in communication with a respective processor model 410*a*, 410*b*, and 410*c*. This communication eliminates the direct communication between the scheduler 430 and the processor 410*a*, 410*b* and 410*c*. The clock gate modules 450*a*, 450*b* and 450*c* allow a user to selectively halt one or more of the processor models 410*a*, 410*b* and 410*c*. As shown in FIG. 18, clock gate modules 450*a* and 450*c* are ON and clock gate module 450*b* is OFF. When a step command is issued, clock gate modules 450*a* and 450*c* (which are ON) forward the step command to their associated processor models 410*a* and 410*c*, respectively. However, clock gate module 450*b* (which is OFF) does not forward the step command to its attached processor model 410*b*. It will be appreciated that the step command is exemplary and that the same logic applies to other commands.

While a specific embodiment of this invention has been described above, those skilled in the art will readily appreciate that many modifications are possible in the specific embodiment, without materially departing from the novel teachings and advantages of this invention. Accordingly, all such modifications are intended to be included within the scope of this invention, as defined in the following claims.

Having thus described the invention, what is claimed is:

1. A system for maintaining synchronization while debugging a multi-processor system, said system comprising:

a. a scheduler;

b. a plurality of processors which communicate with said scheduler;

c. a plurality of debug adapters, wherein each of said processors communicates with at least one of said debug adapters, and wherein each of said debug adapters communicates with said scheduler; and d. a plurality of debuggers, wherein each of said debug adapters communicates with at least one of said debuggers;

wherein said scheduler, said plurality of processors, said plurality of debug adapters, and said plurality of debuggers are implemented in software.

2. The system of claim 1, wherein a plurality of control commands are communicated between said debug adapters and said scheduler.

3. The system of claim 1, wherein said system is implemented using a simulator.

4. The system of claim 1, wherein said system is implemented using an emulator.

5. The system of claim 1, further comprising a plurality of clock gate modules, wherein said clock gate modules allow said processors to be selectively halted.

6. The system of claim 1, wherein the communications between said processors and said scheduler comprise API calls.

7. The system of claim 1, wherein the communications between said debug adapters and said scheduler comprise API calls.

8. The system of claim 1, wherein a plurality of processes are running on at least one of said processors.

9. A method for maintaining synchronization while debugging a multi-processor system, comprising:

a. running at least one software application on at least one processor;

b. running the at least one software application in a debug mode using a debugger, wherein the at least one processor and the debugger communicate via a debug adapter; and c. transmitting at least one control command from the debug adapter to a scheduler;

wherein said at least one processor, said debugger, said debug adapter, and said scheduler are implemented in software.

10. The method of claim 9, further comprising the step of transmitting at least one non-control command between the at least one processor and the debugger via the debug adapter.

11. The method of claim 9, wherein running the at least one software application is accomplished using a plurality of step functions.

12. The method of claim 11, wherein each step in the plurality of step functions is measured using a master clock cycle.

13. The method of claim 11, wherein each step in the plurality of step functions is performed on all of the software applications and the step function for each of the software applications comprises:

a. an update function; and b. a recalc function.

14. The method of claim 11, wherein the at least one software application executes in a run mode by continuously executing a plurality of the step functions.

15. The method of claim 9, further comprising selectively halting processors using at least one clock gate module.

16. In a computer simulation system having a scheduler, a plurality of processor models, a plurality of debuggers and a plurality of debug adapters, a computer-readable medium holding computer executable instructions for performing a method comprising the steps of:

a. running at least one software application on at least one processor;
   b. running the at least one software application in a debug mode using at least one debugger;
   c. transmitting a plurality of non-control commands between the at least one processor and the at least one debugger via at least one debug adapter; and
   d. transmitting a plurality of control commands from the at least one debug adapter to a schedulers;

wherein said at least one processor, said at least one debugger, said at least one debug adapter, and said scheduler are implemented in software.

17. The computer simulation system of claim 16, wherein the computer executable instructions further comprise the step of transmitting at least one non-control command between the at least one processor and the debugger via the debug adapter.

* * * * *